Sept. 2, 1930.    W. J. GLADISH    1,774,708
ICE CREAM DISPENSING MACHINE
Filed Oct. 30, 1929    5 Sheets-Sheet 2

William J. Gladish, Inventor

Sept. 2, 1930.          W. J. GLADISH          1,774,708
              ICE CREAM DISPENSING MACHINE
           Filed Oct. 30, 1929       5 Sheets-Sheet 3

William J. Gladish, Inventor

Sept. 2, 1930.  W. J. GLADISH  1,774,708
ICE CREAM DISPENSING MACHINE
Filed Oct. 30, 1929  5 Sheets-Sheet 5

William J. Gladish, Inventor

Patented Sept. 2, 1930

1,774,708

UNITED STATES PATENT OFFICE

WILLIAM JULIAN GLADISH, OF NORTH CHATTANOOGA, TENNESSEE

ICE-CREAM-DISPENSING MACHINE

Application filed October 30, 1929. Serial No. 403,579.

This invention relates to a machine for dispensing ice cream in cones or other containers, one of the objects being to provide a structure of this character adapted to be positioned above a can holding the ice cream and to gather, pick up, and deliver a predetermined quantity of the ice cream at will.

Another object is to provide a machine which will feed automatically into the can containing the ice cream so that practically all of the contents of the can can be removed ultimately.

A further object is to provide an ice cream dispensing machine which serves to protect the contents of the can, it being unnecessary to bring the hands in contact with any portion of the cream during the dispensing operation or to expose the contents of the can to dust or insects.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Referring to the figures by characters of reference, 1 designates a casing having a movable cover 2 made up preferably of opposed hinged sections. A can for holding ice cream has been indicated at 3 and is located in the casing with its upper end open and below the cover 2.

The machine constituting the present invention includes a housing 4 preferably cylindrical the lower end of which is open and extended between the cover sections 2. Ears 5 project from the housing and may be held to the covers by means of clamping screws 6.

Arranged in the upper portion of the housing 4 is a guide strip 7 supporting a central downwardly extended guide sleeve 8 and guides 9. A frame 10 is arranged in the lower portion of the housing 4 and formed in the wall of the housing between this frame and the strip 7 is an outlet opening 11.

For the purpose of securely attaching housing 4 to the can 3 rods 12 are rotatably mounted in ears 13 extending inwardly from the lower portion of the housing 4. The lower ends of these rods are rotatably mounted in ears 14 extending from the can 3. On each rod is a cam 15 and at the upper end of each rod is a handle 16. The parts are so proportioned that when the housing and the can are properly assembled the cams 15 can be rotated under and into engagement with an annular bead 17 at the top portion of the can 3. Thus the can will be held to the housing 4. By rotating the cams 15 out of engagement with the bead 17 the housing 4 will be disconnected from the can and by subsequently detaching housing 4 from one or both of the cover sections 2, said sections can be swung open to permit the removal and insertion of a can.

The top of the housing 4 is closed by a head 18 and extending through this head at the center thereof is a tubular stem 19 and provided, in its outer surface, with a longitudinal groove 20.

A ratchet wheel 21 is supported by frame 10 and beneath the guide sleeve 8 and this ratchet wheel is feathered on the stem 19 so as to rotate therewith but allow the stem to move longitudinally through the ratchet wheel.

That portion of the stem 19 which projects below the guide sleeve 8 can be enlarged as shown at 22 and has oppositely extended curved scraping blades 23 extending therefrom in a substantially horizontal plane. At the outer end of each of these blades is arranged a scoop 24. The parts are so located and proportioned that when the stem 19 is rotated in one direction the scraping blades, which engage the top surface of the contents of the can 3, will deflect portions of the contents outwardly into the paths of the scoops 24 and these scoops, in turn, will gather up portions of the ice cream.

Mounted on each scoop at the sides thereof are stop ears 25 each of which is provided in its upper end with a recess 26.

To the upper end of the stem 19 are pivotally connected the jaws 27 of a split nut and these jaws have arms 28 extending therefrom. A spring 29 holds the arms normally pressed apart so that the jaws will engage a feed screw 30 extending upwardly beyond the tubular stem 19. The feed screw 30 is held against rotation by any suitable means, such as a bracket 31. Stem 19 does not engage the threads of the screw 30 but is adapted to slide along the screw as long as the jaws 27 engage the screw. By swinging the jaws apart, however, stem 19 can be quickly slid upwardly or downwardly along screw 30 to bring it to any desired position. Arms 32 are mounted to swing upwardly and downwardly in brackets 33 provided in the housing 4 and extending from the free end of each of these arms is a long upper finger 34 and a short lower finger 35, these fingers cooperating to produce recesses 35' between them as shown particularly in Figure 13.

The arms 32 are located above the strip 7 and pivotally connected to these arms by means of studs 36 are the upper ends of push rods 38 and 39.

Figure 10:
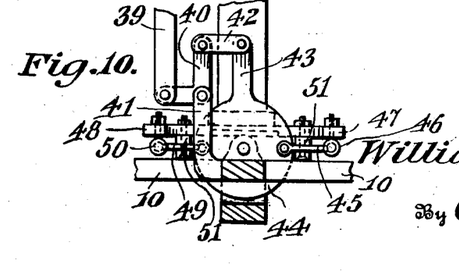
Figure 10 is a section on line 10—10, Figure 3.
Figure 12:
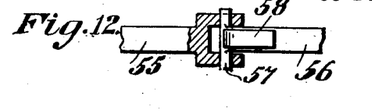
Figure 12 is a view partly in side elevation and partly in section of a portion of the delivery table.

The lower end of the push rod 39 is connected to a bell crank 40 mounted in a bracket 41 carried by frame 10. As shown particularly in Figure 10 this bell crank is connected by a link 42 to an arm 43 radiating from a disk 44. This disk is supported by frame 10 and mounted for rotation in a vertical plane. A link 45 is connected by universal joints 46 to an arm 47 and the disk 44. Arm 47 is mounted to oscillate horizontally about the stem 19 directly above ratchet wheel 21. Another arm 48 is mounted to oscillate on the stem 19 and is connected by a link 49 to disk 44, universal joints 50 being provided for this purpose. The links 45 and 49 are extended in opposite directions from the disk and the arms 47 and 48 have the disk interposed between them. The two arms 47 and 48 carry pawls 51.

Figure 3:
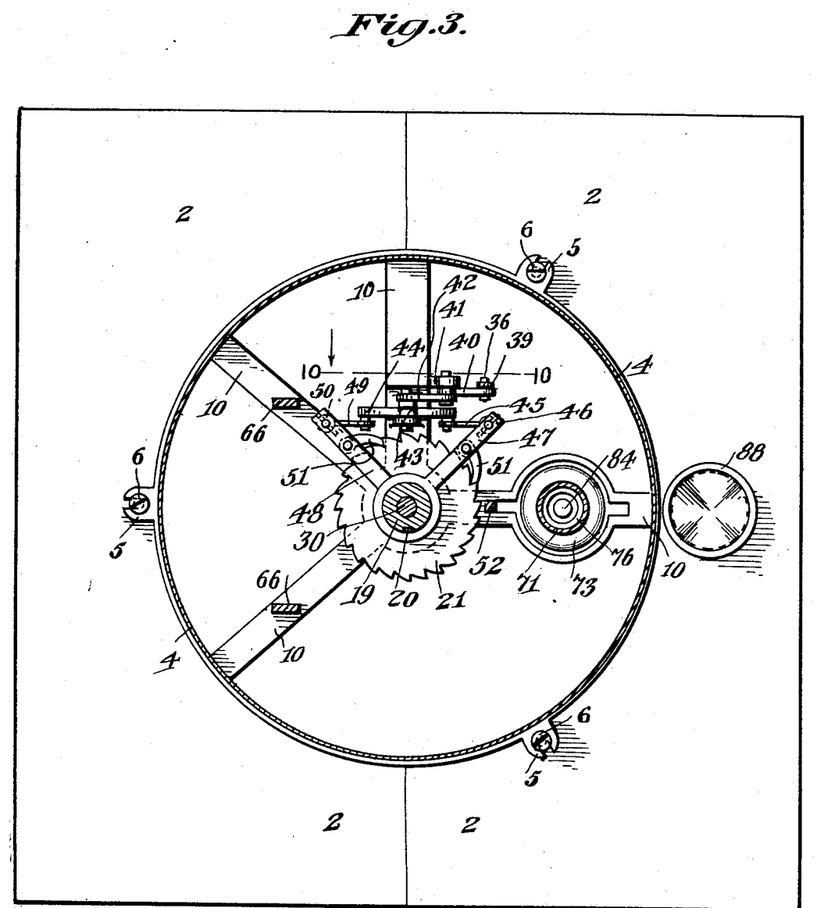
Figure 3 is a section on line 3—3, Figure 1.
Figure 4:
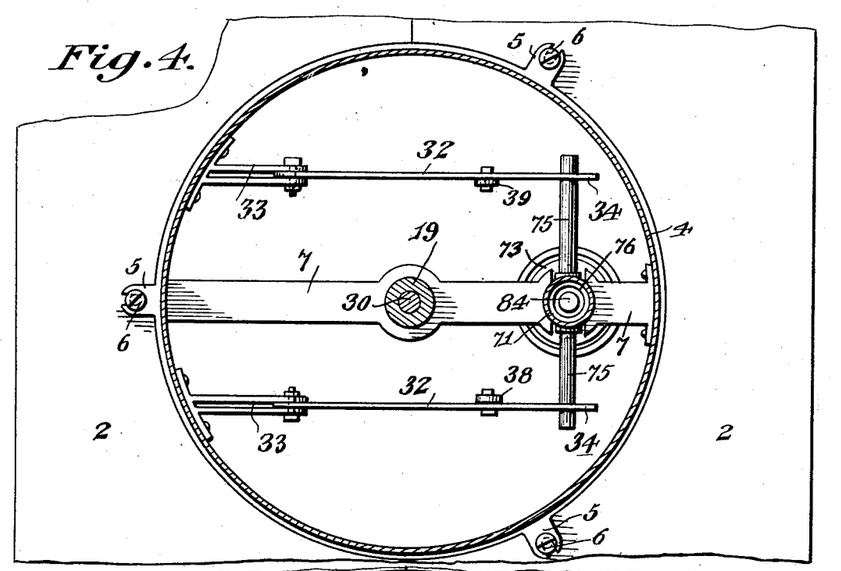
Figure 4 is a section on line 4—4, Figure 1.
Figure 5:
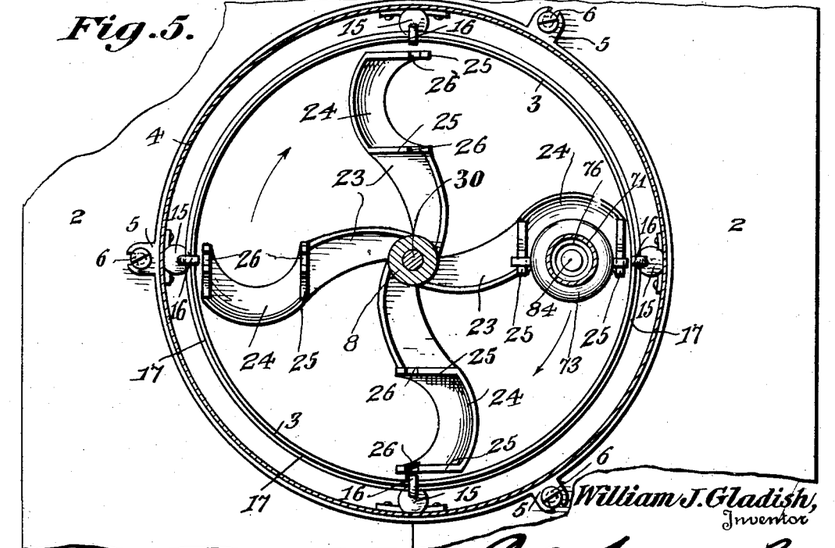
Figure 5 is a section on line 5—5, Figure 1.

When the push rod 39 is thrust downwardly by one of the arms 32 it will swing its bell crank 40 so that motion will be transmitted to the disk 44. This will result in swinging arm 48 to the right in Figure 3 and arm 47 to the left. Thus one of the pawls will impart a rotation to ratchet wheel 21 and stem 19. When the push rod 39 is pulled upwardly the parts will be operated in the opposite direction, causing pawl 51 on arm 47 to impart rotation to the ratchet wheel 21 and stem 19.

Carried by frame 10 is a standard 52 provided, at its upper end, with a cross strip 53 carrying spaced parallel guides 54. In these guides are mounted the sides of a transfer table including an open frame 55 open at one end. To the sides of the open end of this frame are attached converging arms 56 pivotally mounted at 57 and having tripping fingers 58 projecting outwardly from the pivoted ends thereof. Arms 56 do not come together but are provided, at their outer ends, with arcuate jaws 59 oppositely disposed as shown particularly in Figure 2. From these jaws are extended fingers 60 connected by a spring 61. This spring serves to hold the jaws normally drawn toward each other.

Located at opposite sides of the outlet opening 11 are adjustable stop screws 62 or the like, these being located in the paths of the fingers 58.

Frame 55 has a cross rod 63 and the end portions of this rod are connected by links 64 to levers 65 fulcrumed on brackets 66 carried by frame 10. One of these levers is connected by a link 67 to one arm of a bell crank 68 which, in turn, is fulcrumed in a bracket 69 carried by housing 4. The other arm of bell crank 68 is pivotally and slidably engaged by the push rod 38 heretofore referred to, there being a slot 70 in this push rod allowing for a lost motion between push rod 38 and the bell crank 68.

It will be apparent that when the two arms 32 are pushed downwardly simultaneously, the push rod 39 will come into action to actuate bell crank 40 and rotate ratchet wheel 21 before push rod 38 will actuate bell crank 68. This is due to the provision of slot 70. Immediately following the actuation of the ratchet wheel, the bell crank 68 will be shifted to thrust through link 67 against lever 65 thereby causing it to pull through its link 64 upon the frame 55 and draw said frame to the position shown in Figure 2.

Figure 1:
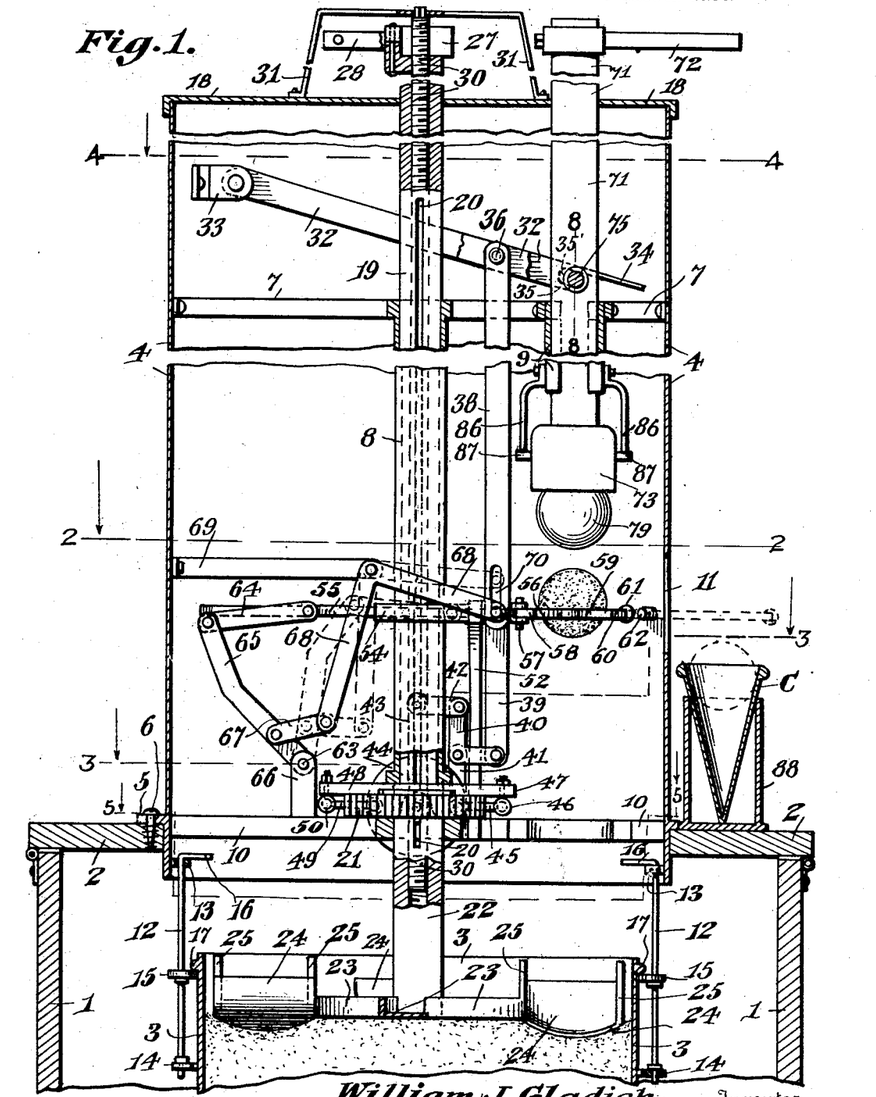
Figure 1 is a vertical section through the apparatus in position above a can containing ice cream, a portion of the casing in which the can is located being also shown in section.

During the upward movement of the arms 32 the foregoing action will be reversed. Rod 39 will first pull on bell crank 40 and again rotate the ratchet wheel while following this operation the lower end of slot 70 will come against bell crank 68 and shift it to pull on levers 65. Thus there will be a thrust through links 64 against frame 55 and said frame will be moved from the position shown in Figure 2 to the dotted line position shown in Figure 1.

Slidably mounted in the guide 9 is a tubular elevating or transfer stem 71 provided at its upper end with an operating handle 72 while its lower end is formed with a socket member 73 formed with diametrically opposed slots 74. Oppositely extending pins 75 are carried by the stem 71 and are located beneath fingers 34 where they can enter the respective recesses 35'.

Figures 6, 7, 8, 9:
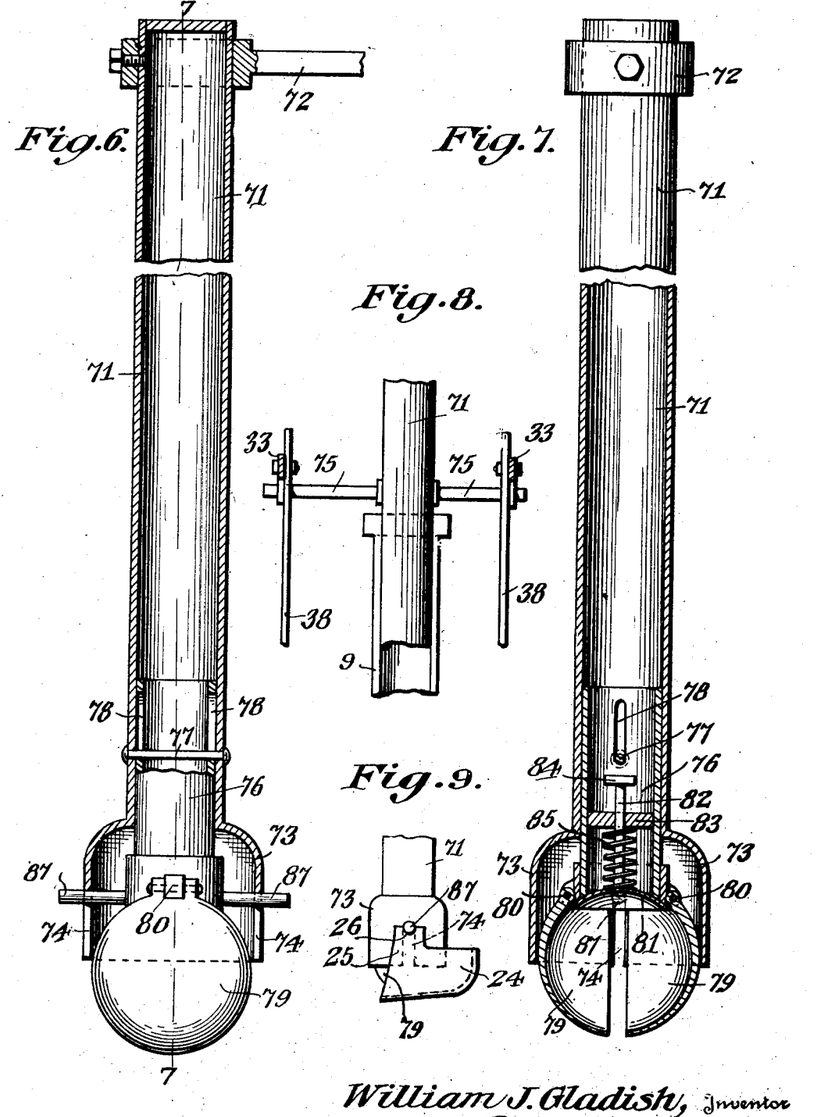
Figure 6 is a view partly in longitudinal section and partly in elevation of the elevating slide.
Figure 7 is a section on line 7—7, Figure 6, the parts being illustrated in the positions assumed thereby when gripping a portion of ice cream.
Figure 8 is a section on line 8—8, Figure 1.
Figure 9 is a side elevation of a portion of the gathering mechanism.

Slidably mounted within the lower portion of the tubular stem 71 is a plunger 76 held against rotation by a cross pin 77 extending diametrically through stem 71 and through slots 78 in the plunger. This plunger projects into the socket member 73 where it is provided with opposed rounded jaws 79 hingedly connected to the plunger at 80. These jaws are adapted to be swung toward each other as shown for example in Figure 7, when the socket member 73 is moved downwardly to partly house the same.

A concavo-convex ejecting head 81 is disposed within the upper portions of the jaws 79 and has a rod 82 extending therefrom and slidable within a partition 83 within plunger 76. This rod has a head 84 for preventing its withdrawal from the plunger. A spring 85 is mounted on the rod between partition 83 and head 81 and serves to hold the head normally projected downwardly between jaws 79 and away from the plunger 76.

Stop fingers 86 are extended downwardly from the guides 9 in the paths of pins 87 that extend in opposite directions from the lower portion of plunger 76 and slide in the slots 74.

In practice a can 3 containing ice cream is placed in the casing 1 and the cover sections 2 are then closed where they may support the housing 4. It may be assumed that some ice cream has been gathered in each of the scoops 24 and that stem 71 is elevated with its socket member 73 above frame 55. At this time pins 75 hold the arms 32 raised above the positions shown in Figure 1 and rod 38 holds frame 55 projected to the dotted line position shown in said figure.

When it is desired to deliver a portion of ice cream a container 88 can be placed outside of the housing 4 directly beneath the outlet 11 or a cone C can be positioned in the container.

The operator pushes downwardly on handle 72. This will cause the two rods 38 and 39 to move downwardly simultaneously because pins 75 will thrust against the short fingers 35 on arms 32. During this movement of the rods 38 and 39 rod 39 will push through bell crank 40 so as to give the ratchet wheel a partial rotation and the socket member 73 will pass between the sides of frame 55 inwardly from the arms 56 of the outwardly projected frame. Just as the socket member 73 passes beneath arms 56 and the sides of frame 55 the upper end of slot 70 will come against bell crank 68 and cause it to retract frame 55 so as to bring the jaws 59 where they will embrace the descending stem 71. These relative positions of the parts have been indicated in Figure 1.

Figures 2, 11, 13, 14:
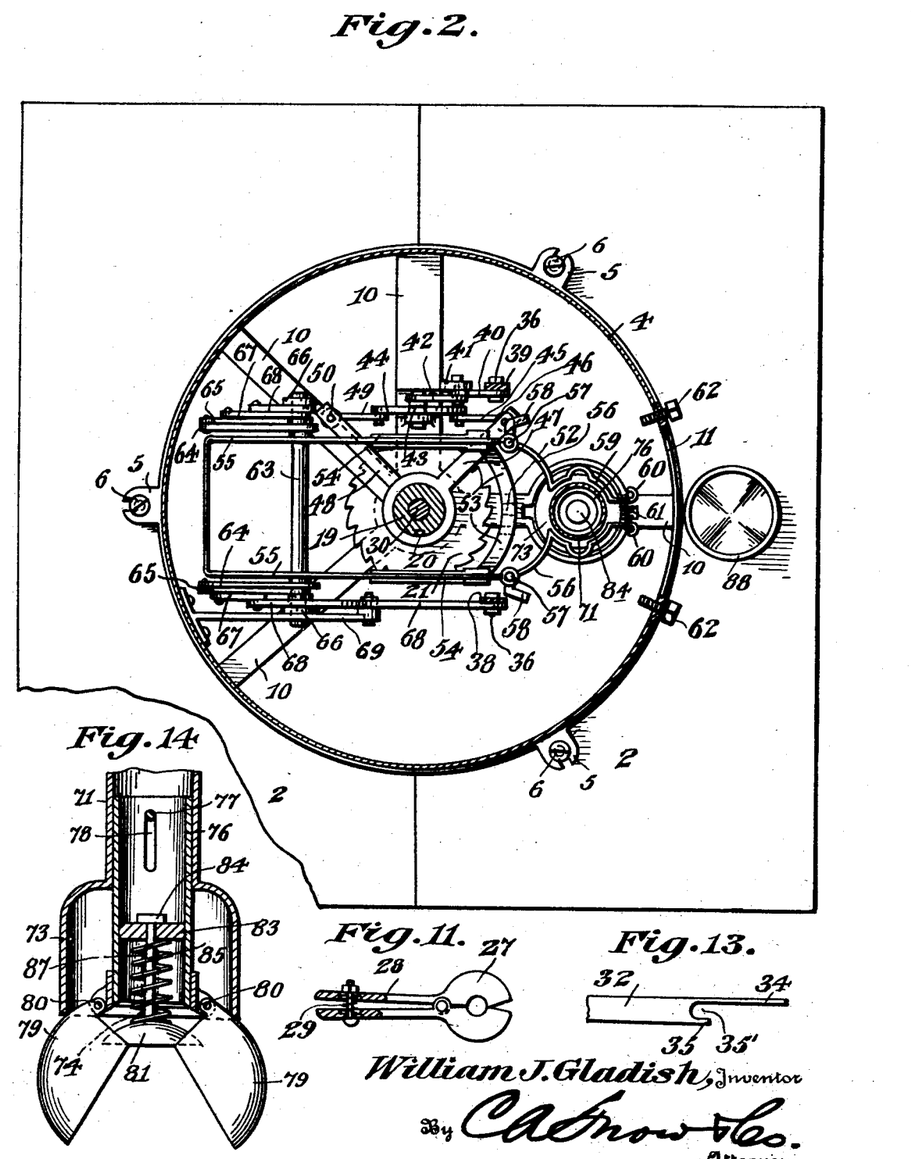
Figure 2 is a section on line 2—2, Figure 1.
Figure 11 is a plan view of the feed nut.
Figure 13 is a side elevation of the free end of one of the arms of the push rods.
Figure 14 is a section like the lower portion of Figure 7 showing the jaws in normal or open positions.

When a slight rotation was imparted to the ratchet wheel 21, the stem 19—22 was given a slight rotation and was at the same time fed downwardly a short distance on the feed screw 30. This movement of the stem 19—22 was sufficient to complete the filling of one of the scoops 24 and to bring said scoop into position in the path of the descending socket member 73. Immediately following this rotation of the scoop 24 and the retraction of frame 55 to the position shown in Figure 1, the pins 75, as they continue to descend, will pass out of engagement with fingers 35, leaving the arms 32 in the positions shown in Figure 1. Stem 71 can continue to descend, pins 75 passing between the guides 9. As the stem descends, the jaws 79 are spread apart as shown in Figure 14 because the plunger 76 is extended downwardly the maximum distance from the stem 71. Furthermore the head 81 is projected downwardly from the stem 71.

When stem 71 approaches the lower limit of its movement the pins 87 will come against the stop ears 25 and rest in the notches or recesses 26. The spread jaws 79 will be supported between ears 25 and above the scoop 24. Continued downward movement of the stem 71 will result in the socket member 73 coming against the rounded outer faces of jaws 79 and pressing them inwardly toward each other. This will cause the jaws to embrace and mold a ball of ice cream gathered from the scoop and will also cause the ice cream to press against head 81 and push it upwardly against the action of spring 85. These parts will thus assume the positions shown in Figure 7.

Stem 71 is now pulled upwardly between the jaws 59 of the ejecting frame. Just before the socket member 73 reaches the jaws 59 of frame 55 the pins 75 come against the long fingers 34. Thus the push rods 38 and 39 begin to move upwardly. As push rod 39 moves upwardly another rotation is imparted to the scoop 24 so as to bring one of the scoops half way to its position for delivery of ice cream. Before the finger 34 of each arm 32 is engaged by a pin 75 and swung upwardly, the socket member 73 comes against the jaws 59 of frame 55 and presses them apart against the action of spring 61. These jaws are held apart until the socket member 73 and the parts therein pass to positions above the jaws whereupon the spring 61 will swing the jaws toward each other.

After the socket member 73 has been brought to position above jaws 59 and the fingers 34 begin to actuate under pressure from pins 75, the rod 38 moves upwardly and, because of the slot 70, there will be a lost motion before bell crank 68 is actuated. During this interval the socket member 73 will continue to move upwardly and pins 87 will be brought against the stop fingers 86 and held against further upward movement. Thus as stem 71 continues moving upwardly the socket member 73 will be withdrawn from around the jaws 79. As the ice cream gripped by the jaws will thus be free from restraint, the spring-pressed head 81 will be released and will eject the ball of ice cream from between the spread jaws and deposit it on the jaws 59 of frame 55. Following this action and as stem 71 completes its upward movement, bell crank 68 will be given a quick movement sufficient to slide frame 55 to the right in Figure 1 so that the jaws 59 and the ball of ice cream thereon will be carried outwardly through opening 11 and brought to a stop directly over the container 88 or the cone C therein. As the frame reaches the limit of its movement, the fingers 58 will come against the stop screws 62 and cause the jaws 59 to swing apart. Thus the ball of ice cream will be released and fall between the jaws into the container provided therefor.

The parts have now been brought to the point of starting and when it is desired to deliver another portion of ice cream the operation already described is repeated. Stem 71 is thrust downwardly, allowing the socket member 73 to pass between the sides of frame 55, then retracting the frame 55 to the position shown in Figures 1 and 2, giving another partial rotation to the scoops so as to bring a scoop filled with ice cream to position in the path of the socket member 73 and feed the scoop slightly into the bulk cream.

Should it be desired to make a quick adjustment of the scoops relative to the bulk ice cream, the split nut formed of the jaws 27 can be opened and stem 19 can be slid longitudinally along the feed screw 30 to bring the scoops to any desired elevation.

What is claimed is:

1. An ice cream dispensing machine including a scoop, a transfer stem mounted for sliding movement, a delivery frame, means operated by the movement of the stem in one direction for gathering bulk material from the scoop, means controlled by the movement of the stem in the opposite direction for depositing the gathered material on the frame.

2. An ice cream dispensing machine including a scoop adapted to work within a bulk container, a transfer stem mounted for reciprocation, means operated by the reciprocation of the stem for feeding the scoop into and collecting portions of the bulk material, means operated by the movement of the stem in one direction for gathering bulk material from the scoop, and means operated by the movement of the stem in the opposite direction for delivering the gathered material laterally away from the stem.

3. A machine for dispensing ice cream from a container holding bulk material, including a scoop for insertion into the container, a transfer stem mounted for reciprocation, means actuated by the reciprocation of the stem for imparting a rotation to the scoop to gather up a portion of the bulk material and bring it into the path of the stem, opposed jaws normally spread apart and movable connected to the stem, and means controlled by the movement of the stem to a predetermined position relative to the scoop, for closing the jaws toward each other thereby to grip and mold a portion of the bulk material contained in the scoop.

4. In an ice cream dispensing machine the combination with a scoop adapted to engage and collect bulk material, a transfer stem mounted for reciprocation, and means actuated by the reciprocation of the stem for rotating the scoop to collect bulk material and bring it into the path of the stem, of a plunger slidable in the stem and normally projecting therefrom, opposed jaws pivotally connected to the plunger, laterally extending pins carried by the plunger, a socket member movable with the stem, and stops upon the scoop for stopping the movement of the pins and plunger with the socket member during the movement of said member and the stem in one direction, said socket member constituting means for embracing the jaws to close them about a portion of the bulk material while the pins are being held against movement.

5. An ice cream dispensing machine including a scoop, means for feeding the scoop into bulk material, a transfer stem mounted for reciprocation, means operated thereby for actuating the scoop feeding means, means carried by the stem for engaging and elevating bulk material from the scoop, and means operated by the stem during the completion of the elevation of material for successively releasing the material from the stem and delivering it laterally relative to the stem.

6. In an ice cream dispensing machine the combination with a scoop and means for feeding the same into bulk material, of a delivering structure mounted for sliding movement, a transfer stem mounted for reciprocation, means actuated by the stem for operating the scoop feeding means, means controlled by the downward movement of the stem for gathering bulk material from the scoop, means controlled by the upward movement of the stem for delivering the gathered bulk material onto the delivering structure.

7. In an ice cream dispensing machine the combination with a scoop and means for feeding the same into bulk material, of a delivering structure mounted for sliding movement, a transfer stem mounted for reciprocation, means actuated by the stem for operating the scoop feeding means, means controlled by the downward movement of the stem for gathering bulk material from the scoop, means controlled by the upward movement of the stem for delivering the gathered bulk material onto the delivering structure, and means controlled by the upward movement of the stem for shifting the delivering structure with the bulk material thereon laterally relative to the stem.

8. An ice cream dispensing machine including a scoop, means for feeding the scoop into bulk material, a transfer stem mounted for reciprocation, means actuated by the stem for operating the scoop feeding means, means carried by the stem for engaging and gripping bulk material contained in the scoop, a delivery frame including opposed yieldingly restrained jaws, the said stem being movable with the bulk material to position above the jaws, means actuated by the stem during its upward movement for successively releasing the bulk material onto the jaws and shifting the frame to carry the bulk material to a point of delivery, and means actuated by the movement of the frame for opening the jaws to discharge the supported bulk material at the point of delivery.

9. In an ice cream dispensing machine the combination with a scoop having upstanding stop members, of a stem mounted for movement toward and from the scoop, a socket member carried by the stem, a plunger movably mounted in the stem, opposed jaws pivotally connected to the plunger and normally spread apart, means projecting from the plunger for engagement with the stops to hold the plunger against downward movement with the stem and socket member, said socket member constituting means for embracing the jaws during the downward movement of the stem relative to the plunger, thereby to swing the jaws toward each other and grip bulk material therebetween.

10. In an ice cream dispensing machine the combination with a scoop having upstanding stop members, of a stem mounted for movement toward and from the scoop, a socket member carried by the stem, a plunger movably mounted in the stem, opposed jaws pivotally connected to the plunger and normally spread apart, means projecting from the plunger for engagement with the stops to hold the plunger against downward movement with the stem and socket member, said socket member constituting means for embracing the jaws during the downward movement of the stem relative to the plunger, thereby to swing the jaws toward each other and grip bulk material therebetween, and a spring actuated ejector adapted to be retracted and held under restraint by the gripped material.

11. In an ice cream dispensing machine the combination with a stem mounted for reciprocation, jaws carried thereby, means on the stem engaging the jaws to hold them about bulk material, and a spring actuated ejector held normally under restraint by the gripped bulk material, of means controlled by the movement of the stem in one direction for shifting the jaws relative to the stem thereby to release the bulk material and the restrained ejecting means.

12. An ice cream dispensing machine including a housing having an outlet, a scoop, a transfer stem mounted for reciprocation, means actuated by the reciprocation of the stem for feeding the scoop into bulk material and bringing a portion of the bulk material into the path of the stem, means carried by the stem for gripping bulk material in the scoop during the downward movement of the stem, a delivering structure slidably mounted in the housing, means controlled by the upward movement of the stem for delivering the engaged bulk material onto said delivering structure, and means controlled by the upward movement of the stem for shifting the delivering structure through the outlet in the housing and conveying the bulk material thereon to a point of delivery.

13. An ice cream dispensing machine including a housing having an outlet, a scoop, means for feeding the scoop into bulk material to gather a portion thereof, a transfer stem mounted for reciprocation, means actuated thereby for operating the feeding means to bring a portion of the bulk material into the path of the stem, and separate means actuated by the stem successively during its upward movement for releasing the engaged bulk material and delivering it laterally through the outlet in the housing.

14. In a dispensing machine the combination with a scoop for engaging and gathering bulk material, of a transfer stem mounted for reciprocation, a delivering structure mounted for lateral sliding movement relative to the stem, means operated by the stem during the first portion of its downward movement for imparting a rotation to the scoop and for retracting the delivering structure to one extreme position, means operated by the stem during its continued downward movement for gripping material contained in the scoop, means operated by the movement of the stem in an upward direction for releasing the gripped material onto the delivering structure, and means operated by the upward movement of the stem for shifting the delivering structure laterally with the material thereon to a point of delivery.

In testimony that I claim the foregoing as my own, I have hereto affixed my signature.

WILLIAM JULIAN GLADISH.